(12) United States Patent
Hubert-Choinard et al.

(10) Patent No.: US 11,142,343 B2
(45) Date of Patent: Oct. 12, 2021

(54) METHOD OF MANUFACTURING A PANEL FOR AN AIRCRAFT PROPULSION UNIT NACELLE

(71) Applicants: Safran Nacelles, Gonfreville L'Orcher (FR); SAFRAN, Paris (FR)

(72) Inventors: Flavie Hubert-Choinard, Gonfreville L'Orcher (FR); Jean-François Thouement, Gonfreville L'Orcher (FR); Sébastien Richard, Paris (FR)

(73) Assignees: Safran Nacelles, Gonfreville L'Orcher (FR); SAFRAN, Paris (FR)

( * ) Notice: Subject to any disclaimer, the term of this patent is extended or adjusted under 35 U.S.C. 154(b) by 0 days.

(21) Appl. No.: 16/552,364

(22) Filed: Aug. 27, 2019

(65) Prior Publication Data

US 2020/0062424 A1    Feb. 27, 2020

(30) Foreign Application Priority Data

Aug. 27, 2018   (FR) ...................................... 18/57692

(51) Int. Cl.
*B64F 5/10* (2017.01)
*B64D 29/00* (2006.01)

(52) U.S. Cl.
CPC ................ *B64F 5/10* (2017.01); *B64D 29/00* (2013.01)

(58) Field of Classification Search
CPC .. B64F 5/10; F05D 2300/174; F05D 2230/22; F05D 2230/234; F05D 2230/31
See application file for complete search history.

(56) References Cited

U.S. PATENT DOCUMENTS

| | | | |
|---|---|---|---|
| 8,002,879 B2 * | 8/2011 | Hook ........................ | D02G 3/32 95/279 |
| 9,607,598 B2 * | 3/2017 | Leon ......................... | B32B 7/02 |
| 2016/0237836 A1 * | 8/2016 | Harris ...................... | F01D 25/24 |
| 2018/0166058 A1 * | 6/2018 | Delehouze ........... | C25D 11/246 |

* cited by examiner

*Primary Examiner* — Jason L Vaughan
*Assistant Examiner* — Amanda Kreiling
(74) *Attorney, Agent, or Firm* — Burris Law, PLLC

(57) ABSTRACT

A method for manufacturing a panel includes disposing one or several supports in a respective cavity(ies) in a honeycomb structure having a first skin and a second skin clasping the honeycomb structure. The supports are made of a fugitive material such as a thermoplastic and are auxetic so that, under the effect of an increase in temperature, their dimension between the first and the second skins remains below a predetermined value.

7 Claims, 4 Drawing Sheets

METHOD OF MANUFACTURING A PANEL FOR AN AIRCRAFT PROPULSION UNIT NACELLE

CROSS-REFERENCE TO RELATED APPLICATIONS

This application claims priority to and the benefit of FR 18/57692 filed on Aug. 27, 2018. The disclosure of the above application is incorporated herein by reference.

FIELD

The present disclosure relates to the field of the manufacture of panels for an aircraft propulsion unit nacelle, in particular panels of the type comprising a honeycomb structure clasped between two skins.

BACKGROUND

The statements in this section merely provide background information related to the present disclosure and may not constitute prior art.

There are known in the state of the art methods for manufacturing panels by assembling composite or metal skins with a honeycomb structure—see for example WO 2017/017369 A1. In this document, the cavities of the honeycomb structure are filled with a fugitive material intended to prevent the collapse of the skins at the level of the cavities.

Nonetheless, the increase in temperature during sintering tends to expand the fugitive material, before the removal thereof. This can cause deformation of the skins under the effect of the forces exerted thereon by the expanded fugitive material.

SUMMARY

In one form of the present disclosure a method for manufacturing a panel for an aircraft propulsion unit nacelle capable of preserving more effectively the inner volume of cavities during an increase in temperature, in particular during a sintering step, is provided.

In some variations the panel comprises a honeycomb structure forming cavities as well as a first skin and a second skin clasping the honeycomb structure. In one variation the cavities may be Helmholtz cavities.

In some variations the method comprises a step of disposing one or several support(s) in respective cavities of the honeycomb structure. The supports are made of a fugitive material such as a thermoplastic.

A fugitive material allows removing the supports of the cavities by heating, their removal from cavities being able to be carried out by any conventional technique or process known to those skilled in the art, for example via perforations made in one of the skins, or via channels provided to this end.

According to the teachings of the present disclosure, the supports are auxetic so that, under the effect of an increase in temperature, their dimension between the first and the second skins remains below a predetermined value.

In some variations of the present disclosure the predetermined value will be selected so that, under the effect of an increase in temperature, the dimension of the supports between the first and the second skins remains identical or presents a small or negligible increase with regard to the forces exerted by these supports against the skin under the effect of the expansion of these supports.

It is thus possible to avoid or limit any deformation of the skins under the effect of the thermal expansion of the supports.

In one form, the supports may have a hexagonal re-entrant shape. Besides the auxetic property conferred by such a shape, it also allows reducing the amount of material constituting these supports, and therefore limiting the amount of material to be removed during the removal of the supports.

In one form, the method may comprise a step of making the first skin and the honeycomb structure by additive manufacturing.

In such a form, the step of making the first skin and the honeycomb structure comprises a deposition of a compound comprising a TiAl-based powdery intermetallic alloy.

TiAl is a material having good performance at high temperature and having a relatively low density.

The step of making the first skin and the honeycomb structure may comprise consolidation of the compound by sintering.

In some variations any step of melting the compound is not implemented. In other words, the consolidation of the compound can therefore be obtained only by heating this compound below its melting temperature.

The absence of melting of the powder particles reduces or avoids TiAl hot cracking.

More generally, the mechanical properties of the panel are thus improved.

Despite the poor ductility of TiAl, the deposition of a compound comprising this material and its consolidation by sintering allows simple and inexpensive manufacturing of a panel with a complex geometry while conferring on this panel a reduced mass and good performance at high temperature.

In some forms, the second skin may be made by depositing a compound comprising a TiAl-based powdery intermetallic alloy or be pre-manufactured and affixed against the honeycomb structure.

Regarding the supports, these may also be made by additive manufacturing simultaneously with the making of the first skin and/or of the honeycomb structure.

For this purpose, it is possible, for example, to use one technique or process to deposit the compound and another technique or process for depositing the material in which the supports are made, and in some variations of the present disclosure these different depositing techniques or processes are arranged for working in parallel.

Such supports allow supporting the second skin, by constituting, for example, supports for depositing the compound or, when the second skin is pre-manufactured, by avoiding or limiting the creeping of the second skin at the level of the cavities during the assembly of this second skin.

According to a first variant, the method may comprise a step of depositing polymer on the TiAl-based powdery intermetallic alloy.

According to a second variant, the compound may comprise a polymer.

In each of these variants, the polymer has a binder function that allows agglomerating the compound according to the shape that it is desired to obtain.

In order to remove the polymeric binder, the method may comprise a debinding step. The debinding may be of the thermal or aqueous type. The debinding step may be carried out before the consolidation step by sintering, or simultaneously.

In one form, the method may comprise a step of vertically disposing the panel so as to inhibit creeping of the skins, in particular at the level of the cavities of the honeycomb structure. The consolidation step, and possibly the debinding step, can be carried out on the panel thus disposed.

To avoid or limit the creeping of the walls of the honeycomb structure which delimit the cavities, walls of the honeycomb structure can be made convex so that, when sintering the vertically disposed panel, these convex walls take on a substantially planar shape under the effect of gravity.

Of course, many other solutions can allow avoiding or limiting creeping of the walls of the honeycomb structure. As non-limiting examples, the walls of the cavities may be corrugated and/or the panel may be vertically disposed so as to orient the cavities to increase the orientation of the walls of the cavities with respect to the horizontal. Such solutions can be combined with one another and/or with the manufacturing of a honeycomb structure with convex walls.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

Other features and advantages of the present disclosure will appear on reading the following non-limiting description and the appended figures, in which.

Identical or similar elements are identified by identical reference numerals in all the figures.

Figure 1:
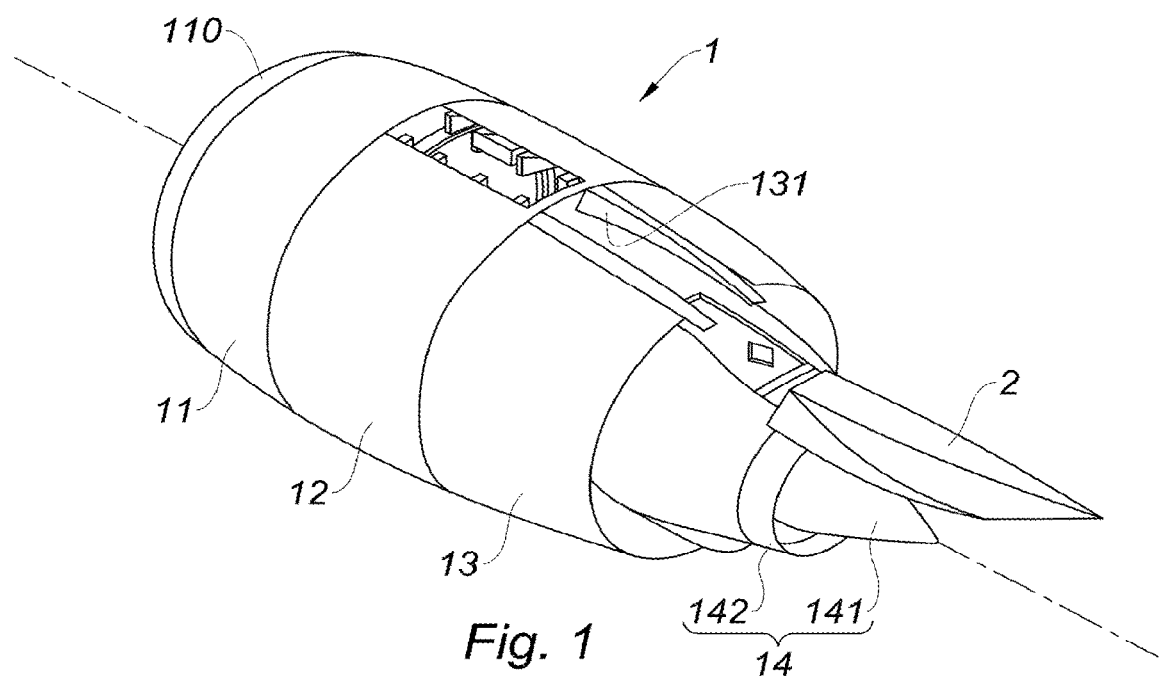
FIG. 1 is a schematic perspective view of an aircraft propulsion unit nacelle according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The teachings of the present disclosure provide a method for manufacturing a panel of an aircraft propulsion unit nacelle, for example a panel constituting a portion of an exhaust nozzle.

An example of an aircraft turbojet engine (not represented) nacelle 1 is illustrated in FIG. 1. The nacelle 1 comprises a pylon 2 intended to be fastened to a wing (not represented) of the aircraft. The nacelle 1 comprises an upstream section 11 with a lip 110 forming an air inlet. The upstream section 11 is adapted to enable enhanced capture towards the turbojet engine of the air needed to supply a fan (not represented) and inner compressors (not represented) of the turbojet engine. The nacelle 1 also includes a middle section 12 receiving the fan as well as a downstream section 13. Under the pylon 2 and downstream of the turbojet engine, the nacelle 1 comprises an exhaust nozzle 14 including a gas ejection cone 141 and a primary nozzle 142. The ejection cone 141 and the primary nozzle 142 of the exhaust nozzle 14 define a passage for a hot air flow exiting the turbojet engine.

The nacelle 1 and in particular the exhaust nozzle 14 may comprise panels manufactured by a method in accordance with the teachings of the present disclosure, whose implementation examples are described hereinbelow.

In general, the panels thus manufactured may constitute sub-elements of the nacelle 1 such as self-supporting panels and/or with or without an acoustic treatment function and/or a structural function.

In at least one form of the present disclosure the method is implemented to manufacture a panel including a honeycomb structure and skins clasping the honeycomb structure. Such a honeycomb structure comprises cavities which may constitute, in some variations, Helmholtz resonators.

Thus, such panels may constitute all or part of a sub-element of the nacelle 1, for example all or part of the ejection cone 141, or of the primary nozzle 142, or of an inner fixed structure 131 of the nacelle 1. These examples are in no way limiting and the teachings of the present disclosure may be implemented to manufacture any nacelle panel 1, for example a panel having a complex geometry and subjected to significant thermal stresses such as parts in direct or indirect contact with the hot air flow exiting the turbojet engine.

In one form, the method implements additive manufacturing steps, being understood that an additively manufactured panel may, according to the teachings of the present disclosure, be assembled with another part manufactured by any method, for example a subtractive method.

In one form, the method comprises a step of depositing a compound comprising a TiAl-based powdery intermetallic alloy.

This compound may take on the form of granules or wires.

In some variations, the method does not comprise any step of melting the compound.

In at least one variation the compound is consolidated by sintering.

In variations where a polymeric binder is used, the polymer may either be deposited on the TiAl-based powdery intermetallic alloy, or it may be integrated directly into the compound before depositing the compound comprising the polymer.

In some variations, the removal of the polymer may be carried out during a specific debinding step.

The effective implementation of these different steps falls within the general skills of those skilled in the art, specialized in the manufacture of nacelles by an additive method. The combination, on the one hand, of the deposition of a compound followed by consolidation by sintering—without melting—and, on the other hand, of the use of TiAl as constituent of the compound, allows manufacturing simply and at a lower cost a panel, in particular with a complex geometry, reduced mass and having good performance at high temperature.

Figure 2:
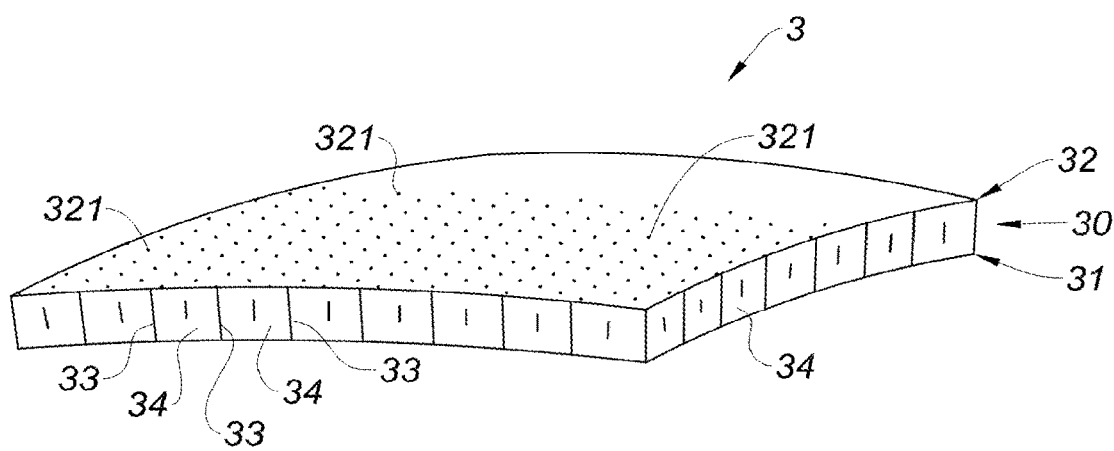
FIG. 2 is a schematic perspective view of an acoustic panel of an aircraft propulsion unit nacelle according to the teachings of the present disclosure.

FIG. 2 shows a panel 3 made using the method according to the teachings of the present disclosure.

The panel 3 comprises a honeycomb structure 30 clasped between two skins 31 and 32.

In this example, the honeycomb structure 30 constitutes Helmholtz-type cavities 34 delimited by transverse walls 33.

The skin 32 is herein an acoustic skin comprising perforations 321 communicating the cells 34 with an external volume of the panel 3.

The additive manufacturing method described hereinabove may be implemented to manufacture all or part of such a panel 3.

For example, it is possible to manufacture the skins 31 and 32 and the honeycomb structure 30 by additive manufacturing. Alternatively, it is possible to manufacture only the honeycomb structure 30 and one of the skins, for example the skin 31, by additive manufacturing and then affixed over the honeycomb structure 30 the other skin 32 previously manufactured by any method. Thus, in the latter case, the skin 32 may be manufactured according to an additive method or according to a subtractive method—in the latter case, the perforations 321 may for example be obtained by drilling a solid sheet metal before or after affixing this sheet metal over the honeycomb structure 30. More generally, the skins and the honeycomb structure of the panel 3 may be made according to any technique.

Figure 3:
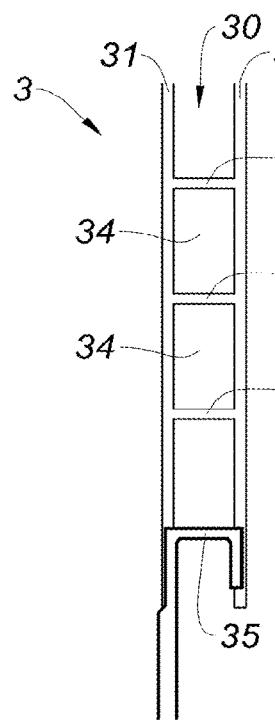
FIG. 3 is a schematic view of an acoustic panel of an aircraft propulsion unit nacelle in a vertical position according to the teachings of the present disclosure.

In one form illustrated in FIG. 3, the panel 3 may be disposed vertically to carry out the consolidation step by sintering, so as to avoid the creeping of the skins 31/32 at the level of the cavities 34 of the honeycomb structure 30, that is to say outside the areas where the skins are supported by the walls 33.

To avoid creeping of the cavity walls 33 during sintering with the vertically disposed panel, the honeycomb structure 30 may be manufactured with convex walls 33 so that, when sintering the vertically disposed panel, these convex walls take on a substantially flat shape under the effect of gravity.

Figure 4:
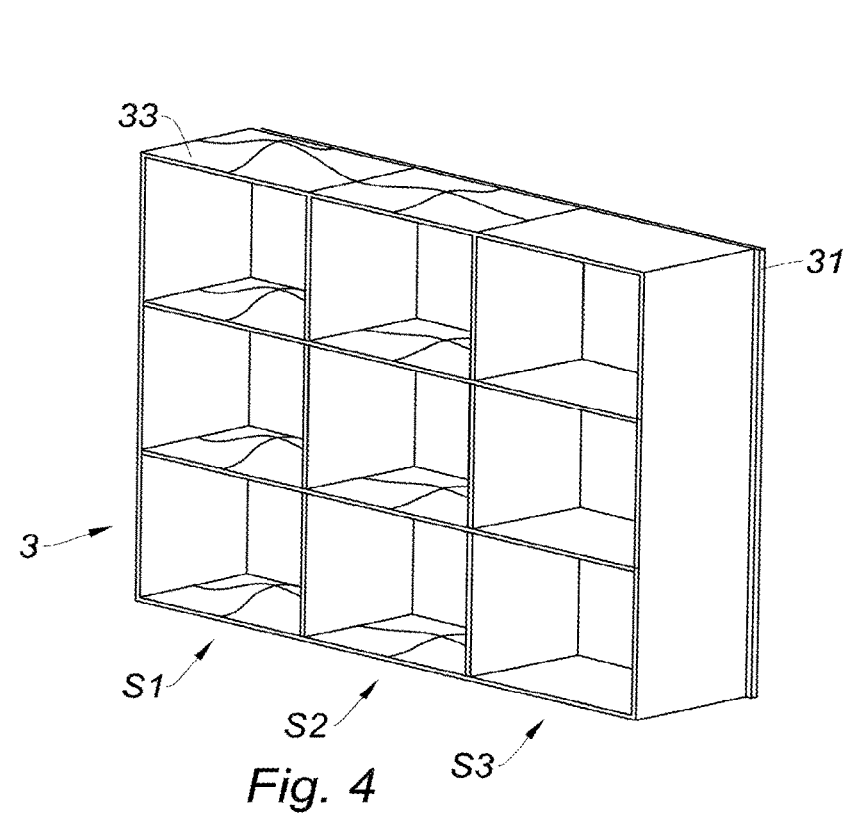
FIG. 4 is a schematic perspective view of an acoustic panel of an aircraft propulsion unit nacelle in a vertical position, with walls having a convex honeycomb structure according to the teachings of the present disclosure.
Figure 5:
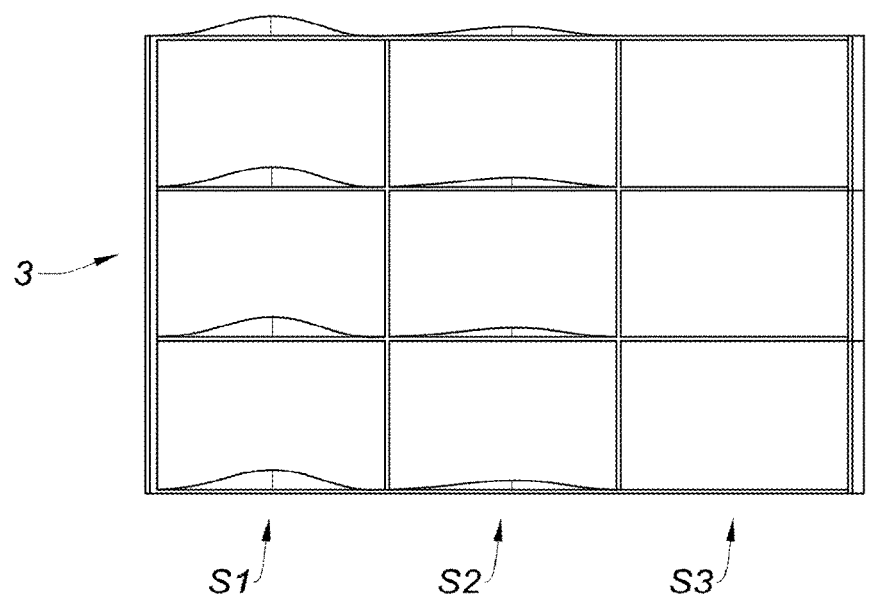
FIG. 5 is a schematic front view of the panel of FIG. 4.

FIGS. 4 and 5 show a panel 3 with a skin 31 and a honeycomb structure comprising a set of horizontal and vertical walls 33 delimiting cavities, the panel 3 being represented in said vertical position. In this example, the horizontal walls are likely to creep during sintering. For purely illustrative reasons, these figures show two series S1 and S2 of convex horizontal walls and a series S3 of planar horizontal walls.

Figure 8:
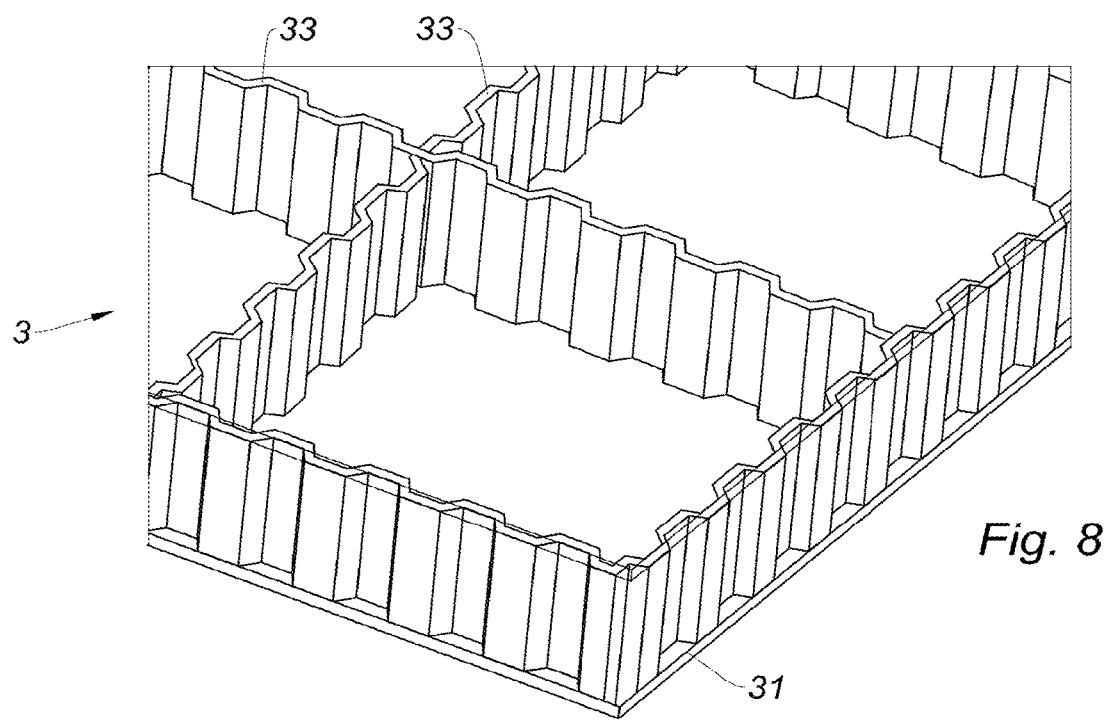
FIG. 8 is a partial schematic perspective view of an acoustic panel of an aircraft propulsion unit nacelle with walls having a corrugated honeycomb structure according to the teachings of the present disclosure.

FIG. 8 shows a panel 3 with a skin 31 and a honeycomb structure comprising corrugated walls 33. The corrugation of the walls 33 also allows limiting the creeping thereof during sintering. In a non-represented form, it is possible to make walls 33 that are both convex and/or corrugated.

Depending on dimensions and mechanical and thermal stresses to which the panel 3 is subjected during sintering, the dimensions and the shape of the convex walls can be adapted (compare for example, the series S1 with the series S2) so that, after sintering, these walls take on a substantially planar shape.

According to the teachings of the present disclosure, the method comprises a step of disposing supports 4 in respective cavities of the honeycomb structure 30.

Figure 6:
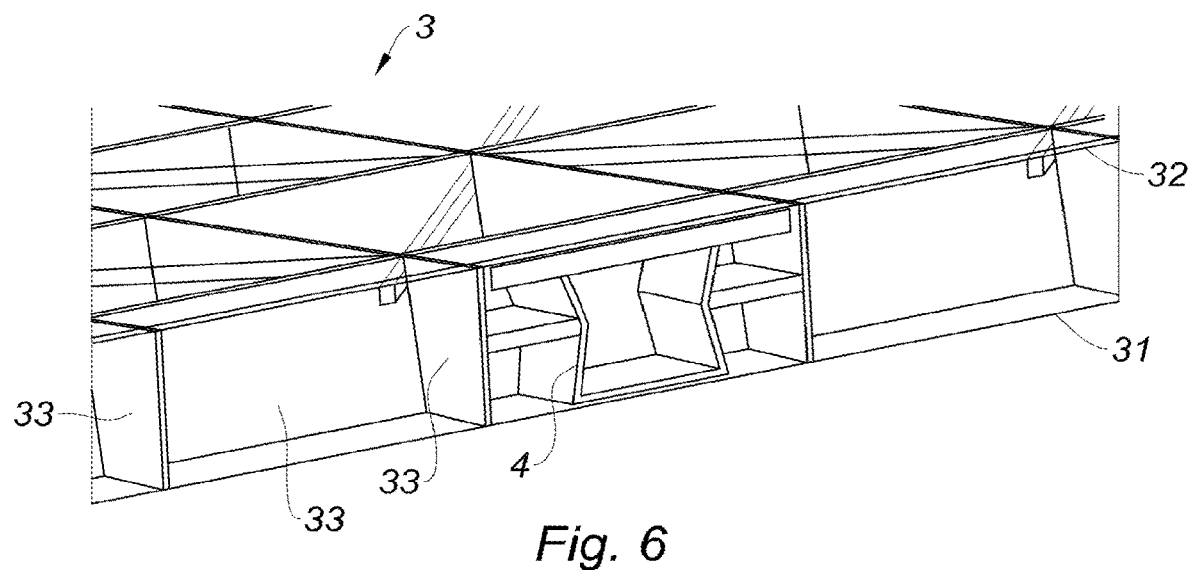
FIG. 6 is a partial schematic perspective view of an acoustic panel of an aircraft propulsion unit nacelle, the panel comprising an auxetic support housed within a cavity according to the teachings of the present disclosure.
Figure 7:
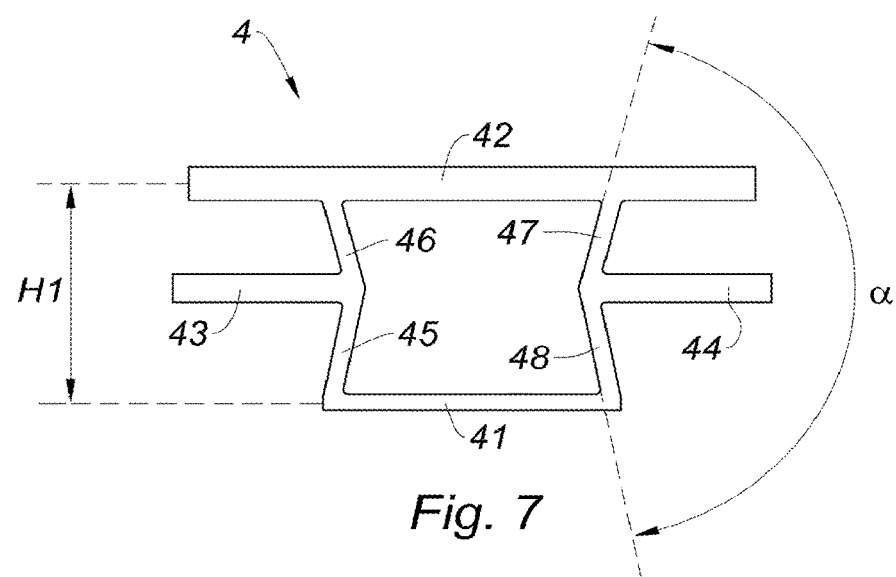
FIG. 7 is a schematic view of the auxetic support illustrated in FIG. 6.

An example of a support 4 is shown in FIG. 7, and the disposition of such a support 4 in a cavity is illustrated in FIG. 6.

Such a disposition of supports 4 within the honeycomb structure allows, for example, supporting the pre-manufactured skin 32 when it is affixed over the honeycomb structure 30, or else supporting the compound when the skin 32 is manufactured according to the method disclosed herein.

In order to be able to remove the supports 4 which are enclosed in the honeycomb structure after assembling or manufacturing the skin 32, these supports 4 are made of a fugitive material, for example made of a thermoplastic material.

Removal of the fugitive material, for example during sintering, may be carried out according to any known technique, for example by evacuation through the perforations 321 made in the skin 32 (see FIG. 2) or else via specific channels (not represented).

Such supports 4 may either be introduced into the cavities before manufacturing or assembling the skin 32 or be made by additive manufacturing simultaneously with the manufacturing of the skin 31 and/or of the honeycomb structure 30.

The support 4 illustrated in FIGS. 6 and 7 is auxetic so that, under the effect of an increase in temperature, its dimension H1 between the two skins 31 and 32 remains below a predetermined value which is selected in practice so as to limit or prevent the expansion of the support 4 and exert a force on the skins 31 and 32 which may deform them.

In the particular case of the support 4 of FIG. 7, the support 4 has a hexagonal re-entrant shape. This support 4 comprises a lower portion 41 intended to come into contact with one of the skins (skin 31), an upper portion 42 intended to come into contact with the other skin (skin 32), arms 43 and 44 having ends intended to come into contact with respective walls 33, and connection portions 46-48 connecting the arms 43 and 44 to the lower 41 and upper 42 portions.

The connection portions 46-48 form, together with the lower 41 and upper 42 portions, said hexagonal re-entrant shape (see FIG. 7).

Such a support 4 is dimensioned so that the expansion of the arms 43 and 44 enclose the angle α formed by the connection portions 45 and 46 on the one hand, and by the connection portions 47 and 48 on the other hand.

It is therefore understood that the expansion of the support 4 thus allows keeping the dimension H1, which represents the dimension of the support 4 between the two skins, substantially constant.

Figure 10:
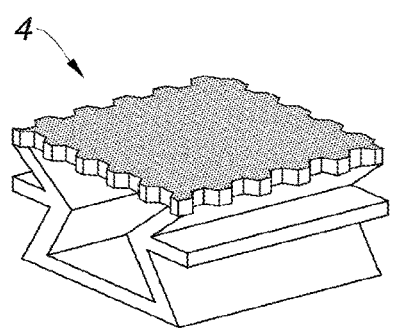
FIG. 10 is a schematic view of the auxetic support illustrated in FIG. 9.
Figure 9:
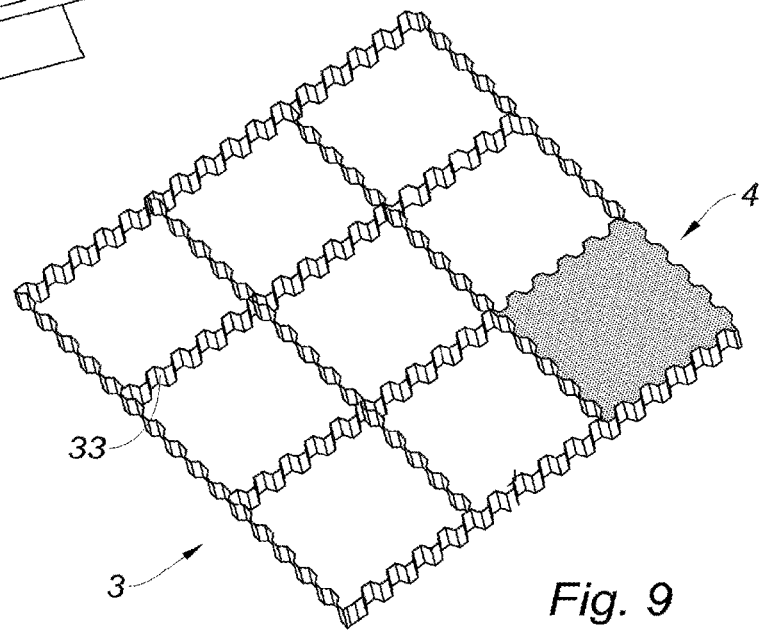
FIG. 9 is a schematic perspective view of the panel of FIG. 8, the panel comprising an auxetic support housed in a cavity according to the teachings of the present disclosure.

FIG. 9 shows a panel 3 similar to that of FIG. 8 with corrugated walls 33. In this case, it is possible to use a support 4 as illustrated in FIG. 10, comprising a corrugated periphery, and dimensioned to conform to the corrugated contours of a cavity (see FIG. 9).

Of course, the teachings of the present disclosure are not limited to the examples that have just been described and many adjustments may be made to these examples without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A method for manufacturing a panel for a nacelle of an aircraft propulsion unit, the panel comprising a honeycomb structure forming cavities, a first skin and a second skin clasping the honeycomb structure, the method comprising:

disposing one or several supports in respective cavities of the honeycomb structure, the supports being made of a fugitive material such as a thermoplastic, wherein the supports are auxetic such that under the effect of an increase in temperature, a dimension between the first and the second skins remains below a predetermined value.

2. The manufacturing method according to claim 1 further comprising producing the first skin and the honeycomb structure by additive manufacturing.

3. The manufacturing method according to claim 2, wherein the supports are made by additive manufacturing simultaneously with at least one of the making of the first skin and the honeycomb structure.

4. The manufacturing method according to claim 2, wherein making the first skin and the honeycomb structure comprises a deposition of a compound comprising a TiAl-based powdery intermetallic alloy.

5. The manufacturing method according to claim 4, wherein making the first skin and the honeycomb structure comprises consolidation of the compound by sintering.

6. The manufacturing method according to claim 1, wherein the second skin is made by depositing a compound comprising a TiAl-based powdery intermetallic alloy.

7. The manufacturing method according to claim 1, wherein the second skin is pre-manufactured and affixed against the honeycomb structure.

* * * * *